United States Patent
Li et al.

(10) Patent No.: US 10,141,743 B2
(45) Date of Patent: Nov. 27, 2018

(54) BIPOLAR VSC-HVDC AND UPFC HYBRID TOPOLOGY AND AN OPERATION METHOD THEREOF

(71) Applicants: State Grid Jiangsu Electric Power Research Institute, Nanjing, Jiangsu (CN); State Grid Corporation of China, Beijing (CN)

(72) Inventors: Peng Li, Jiangsu (CN); Jinjiao Lin, Jiangsu (CN); Xiangping Kong, Jiangsu (CN); Lei Gao, Jiangsu (CN); Haosheng Huang, Jiangsu (CN); Xinyue Gong, Jiangsu (CN); Yubo Yuan, Jiangsu (CN)

(73) Assignees: State Grid Jiangsu Electric Power Research Institute (CN); State Grid Corporation of China (CN)

( * ) Notice: Subject to any disclaimer, the term of this patent is extended or adjusted under 35 U.S.C. 154(b) by 0 days.

(21) Appl. No.: 15/738,105

(22) PCT Filed: Nov. 30, 2016

(86) PCT No.: PCT/CN2016/107964
§ 371 (c)(1),
(2) Date: Dec. 19, 2017

(87) PCT Pub. No.: WO2018/098673
PCT Pub. Date: Jun. 7, 2018

(65) Prior Publication Data
US 2018/0309298 A1 Oct. 25, 2018

(51) Int. Cl.
*H02J 3/36* (2006.01)
*H02J 3/18* (2006.01)
(52) U.S. Cl.
CPC .............. *H02J 3/36* (2013.01); *H02J 3/1814* (2013.01)

(58) Field of Classification Search
CPC ........ H02J 3/18; H02M 1/32; H02M 1/33592; H02M 1/3376; H02M 2001/007;
(Continued)

(56) References Cited

U.S. PATENT DOCUMENTS 5,901,053 A * 5/1999 Eriksson .................... H02J 3/36
363/35
9,461,560 B2 * 10/2016 Inoue ..................... H02M 7/217
(Continued)

FOREIGN PATENT DOCUMENTS

| CN | 102983586 A | 3/2013 |
| CN | 103001242 A | 3/2013 |

(Continued)

OTHER PUBLICATIONS

International Searching Authority, ISR, Jul. 27, 2017, PCT Application No. PCT/CN2016/107964.
(Continued)

*Primary Examiner* — Yemane Mehari (57) ABSTRACT

The present invention discloses a Bipolar VSC-HVDC and UPFC Hybrid Topology and its operation method. The first control circuit includes a positive and a negative circuit at the series side, in which the VSC converter can operate in bipolar mode; the second control circuit includes a positive and a negative circuit, in which the VSC converter can operate in bipolar mode; the third control circuit is the same as the second control circuit in terms of structure; the positive electrode and negative electrode of the second control circuit are connected to the DC bus via a DC breaker respectively; the other end of the DC transmission line is connected to the third control circuit via a DC breaker. In addition, the hybrid topology of the present invention can perform multiple operation methods and fast conversions, including the VSC-HVDC and UPFC hybrid operation, UPFC operation, VSC-HVDC operation and generalized (Continued)

UPFC operation, featuring long distance power transmission for high power in VSC-HVDC mode and distribution control of AC power flow in UPFC mode. As a result, the flexibility and availability of system operation can be improved.

6 Claims, 9 Drawing Sheets

(58) Field of Classification Search
CPC ........... H02M 2001/325; H02M 7/538; H02M 7/5387; H02M 2007/4835
USPC .............................................. 363/17, 35, 126
See application file for complete search history.

(56) References Cited

U.S. PATENT DOCUMENTS

| | | | | |
|---|---|---|---|---|
| 2014/0247629 A1* | 9/2014 | Crane | ....................... | H02J 3/36 363/35 |
| 2015/0028826 A1* | 1/2015 | Davidson | ................ | H02M 1/32 323/237 |
| 2015/0035364 A1* | 2/2015 | Davidson | ............... | H02H 7/268 307/36 |
| 2017/0229857 A1* | 8/2017 | Kral | ......................... | H02H 7/28 |

FOREIGN PATENT DOCUMENTS

| | | | |
|---|---|---|---|
| CN | 103972887 A | 8/2014 | |
| CN | 105896587 A | 8/2016 | |

OTHER PUBLICATIONS

Phase-domain power flows in the rectangular co-ordinates frame of reference including VSC-based FACTS controllers, Angeles-Camacho, C et al.

Electric Power Systems Research, Mar. 31, 2008, pp. 494-506, vol. 78, Issue 3.

\* cited by examiner

BIPOLAR VSC-HVDC AND UPFC HYBRID TOPOLOGY AND AN OPERATION METHOD THEREOF

FIELD

The present invention belongs to a flexible AC and DC to technology which specifically refers to a Bipolar VSC-HVDC and UPFC Hybrid Topology and its operation method.

BACKGROUND

Currently, breakthrough has been made in the engineering application of large capacity long distance DC transmission technology that plays an important role in the optimal allocation of energy resources. As the fully controlled switching device emerges and matures, the flexible DC technology with VSC (Voltage Source Converter) as its core component has become an important development trend for DC transmission and distribution, which can not only provide more reliable power supply, redundant system, adaptable power supply mode, flexible and secure flow control, but also effectively improve the impact of new energy on the safe and stable operation of poster grid. In general, the flexible DC transmission system adopts two-end or multi-end VSC DC parallel topology whose AC side is connected w parallel to the electrical system via a transformer.

As the scale and load of modern power grid continues to grow, it is more difficult to control the power floss and voltage of AC power grid; meanwhile, owing to the scarce land resources and enhanced environmental requirements, the newly constructed substation and transmission line have become more and more constrained. Therefore, new technologies are required to give lull play to the potentials of the existing power grid, for which the Flexible Alternative Current Transmission System (FACTS) has offered an important solution. As the highest level of FACTS technology at present, the Unified Power Flow Controller (UPFC) can perform flexible control on multiple electrical parameters through VSC control to regulate the active and reactive power of transmission lines and control the reactive voltage of the system. In general, the two VSC DC sides of UPFC are connected to each other back to back, among which one end is connected to the power gird in parallel, and the other end is connected to the power grid in series via a series transformer.

SUMMARY

To achieve the aforesaid objectives, the present invention has offered a Bipolar VSC-HVDC and UPFC Hybrid. Topology and its operation method, which not only integrates the functions and advantages of VSC-HVDC and UPFC, but also features long distance power transmission for flexible DC projects and distribution control of AC power flow in UPFC mode. In addition, the bipolar structure can be combined with the operation method to improve the flexibility and availability of system operation, switching between the fault operation modes of equipment and making full use of equipment capacity.

Therefore, the present invention has adopted the following technical schemes to achieve the aforesaid objectives and effects:

A Bipolar VSC-HVDC and UPFC Hybrid Topology includes a first control circuit, a second control circuit, a DC transmission line and a third control circuit; the first control circuit with double circuit transmission lines can be used as a circuit at the series side of UPFC, including a positive circuit and a negative circuit, both of which contain a series VSC converter and a series transformer as well as a thyristor bypass switch, a bypass switch (preferably a fast mechanical bypass switch) and a resistor installed between them, the VSC converter in the positive circuit and the negative circuit at the series side can operate in bipolar mode, and the positive and negative electrode of the first control circuit is connected to the DC bus via a DC breaker; the second control circuit includes a positive circuit and a negative circuit, both of which contain a shunt transformer and a VSC converter. Among them, the VSC converters in the positive and negative circuit can operate in bipolar mode with an earth electrode, and the positive and negative electrode of the second control circuit are connected to the DC bus via a, DC breaker; the third control circuit is the same as the second control circuit in terms of structures; one end of the DC transmission line is connected to the DC bus via a DC breaker; and the other end of the DC transmission line is connected to the positive and negative electrode of the third control circuit.

As a preferred scheme, the VSC converters in the first control circuit and the second control circuit are connected to the same earth electrode.

As a preferred scheme, the VSC converters in the first control circuit and the second, control circuit are connected back to back to the same DC bus.

As a preferred scheme, the series transformers in the positive circuit and negative circuit at the series side are connected to the AC transmission line via a bypass switch.

The operation method of a Bipolar VSC-HVDC and UPFC Hybrid Topology includes the following steps:

Step 1: Control the operation status of the first, second and third control circuit in the Bipolar VSC-HVDC and UPFC Hybrid Topology to formulate a designed electrical system:

Step 2: Control the first, second and third control circuit in the designed electrical system respectively based on the designed control method.

As a preferred scheme, the designed electrical system in Step 1 can be specifically divided into the following four kinds:

1.1 Enable the first, second and third control circuit and the DC transmission line to formulate a bipolar VSC-HVDC and UPFC hybrid system;

1.2 Enable the first and second control circuit; and disable the DC transmission line and the third control circuit to formulate a UPFC system;

1.3 Disable the first control circuit; and enable the second control circuit, DC transmission line and the third control circuit to formulate a bipolar VSC-HVDC system;

1.4 Enable the first control circuit, DC transmission line and the third control circuit; and disable the second control circuit to formulate a generalized UPFC system.

As a preferred scheme, Step 2 can be divided into the following procedures:

2.1 When a bipolar VSC-HVDC and UPFC hybrid system is adopted for the electrical system, the constant DC voltage control method can be used to control the second control circuit and regulate the reactive voltage of AC system; the line power control method can be used to control the first control circuit and the active or reactive power of the transmission line; the constant active power control, method can be used to control the third control circuit and, regulate the reactive voltage of AC system;

2.2 When a UPFC system is adopted for the electrical system, the constant DC voltage control method can be used to control the second control circuit and regulate the reactive voltage of AC system; the line power control method can be used to control the first control circuit and the active or reactive power of the transmission line; block or disable the VSC converter in the third control circuit;

2.3 When a bipolar VSC-HVDC system is adopted for the electrical system, the constant DC voltage control method can be used to control the second control circuit and regulate the reactive voltage of AC system; the constant active power control method can be used to control the third control circuit and regulate the reactive voltage of AC system; block or disable the VSC converter in the first control circuit and turn on the corresponding bypass switch;

2.4 When a generalized UPFC system is adopted for the electrical system, the constant DC voltage control method can be used to control the third control circuit and regulate the reactive voltage of AC system; the line power control method can be used to control the first control circuit and the active or reactive power of the transmission line; block or disable the VSC converter in the second control circuit.

As a preferred scheme, when a bipolar VSC-HVDC and UPFC hybrid system is adopted for the electrical system the following methods can be adopted in case of any failures:

(1) In case of any failures occurred in the transmission line, enable the DC breaker at both sides of the faulted transmission line through the protection action, and block the VSC converter connected to the faulted transmission line in the third control circuit; the VSC converter in the second control circuit can operate continuously to control DC voltage and unipolar transmission power of the VSC-HVDC system; and the VSC converter in the first control circuit can operate continuously to control the power of double circuit lines;

(2) case of any failures occurred in the third control circuit; block the faulted VSC converter in the third control circuit through the protection action and enable the DC breaker connected to the faulted VSC converter; the VSC converter in the second control circuit can operate continuously to control DC voltage and unipolar transmission power of the VSC-HVDC system; and the VSC converter in the first control circuit can operate continuously to control the power of double circuit lines;

(3) In case of any failures occurred in the second control circuit, block the faulted VSC converter in the second control circuit through the protection action and enable the DC breaker connected to the faulted VSC converter; the VSC converter in the third control circuit can operate continuously and the control method of the faulted VSC converter is changed into constant DC voltage control with unipolar transmission power of the VSC-HVDC system; and the VSC converter in the first control circuit can operate continuously to control the power of double circuit lines;

(4) In case of any failures occurred in the first control circuit, block the faulted VSC converter in the first control circuit through the protection action and enable the DC breaker connected to the faulted VSC converter. At the meantime, switch on the corresponding bypass switch at the series side and enable the second control circuit, DC transmission fine and the third control circuit.

The beneficial effect of the present invention:

The present invention has offered a Bipolar VSC-HVDC and UPFC Hybrid Topology and its operation method, which not only integrates the functions and advantages of VSC-HVDC and UPFC, but also features long distance power transmission for flexible DC projects and distribution control of AC power flow in UPFC mode. In addition, the bipolar structure can be combined with the operation method to improve the flexibility and availability of system operation, switching between the fault operation modes of equipment and making full use of equipment capacity.

DETAILED DESCRIPTION

Based on the following embodiments, the present invention should be further elaborated for its purposes, technical schemes and advantages. It shall be understood that the specific embodiments described here can only be used to explain the present invention instead of confining it.

The present invention should be elaborated liar its application principle with reference to the attached drawings.

In recent years, as the VSC technology evolves from two-level and three-level topology into multi-level topology, the modular multilevel converter (MMC) has become a typical representative, which promotes the application of power electronic technology in high voltage great power transmission field. In actual application, the flexible DC transmission device and UPFC are constructed and operated independently. To enhance equipment utilization, reduce costs and give full play to the power transmission and flow control of the flexible DC and UPFC, a new topology can be used to perform the joint construction, centralized operation and coordinated control of the flexible DC and UPFC, which will have great significance in economy and technology.

Figure 1:
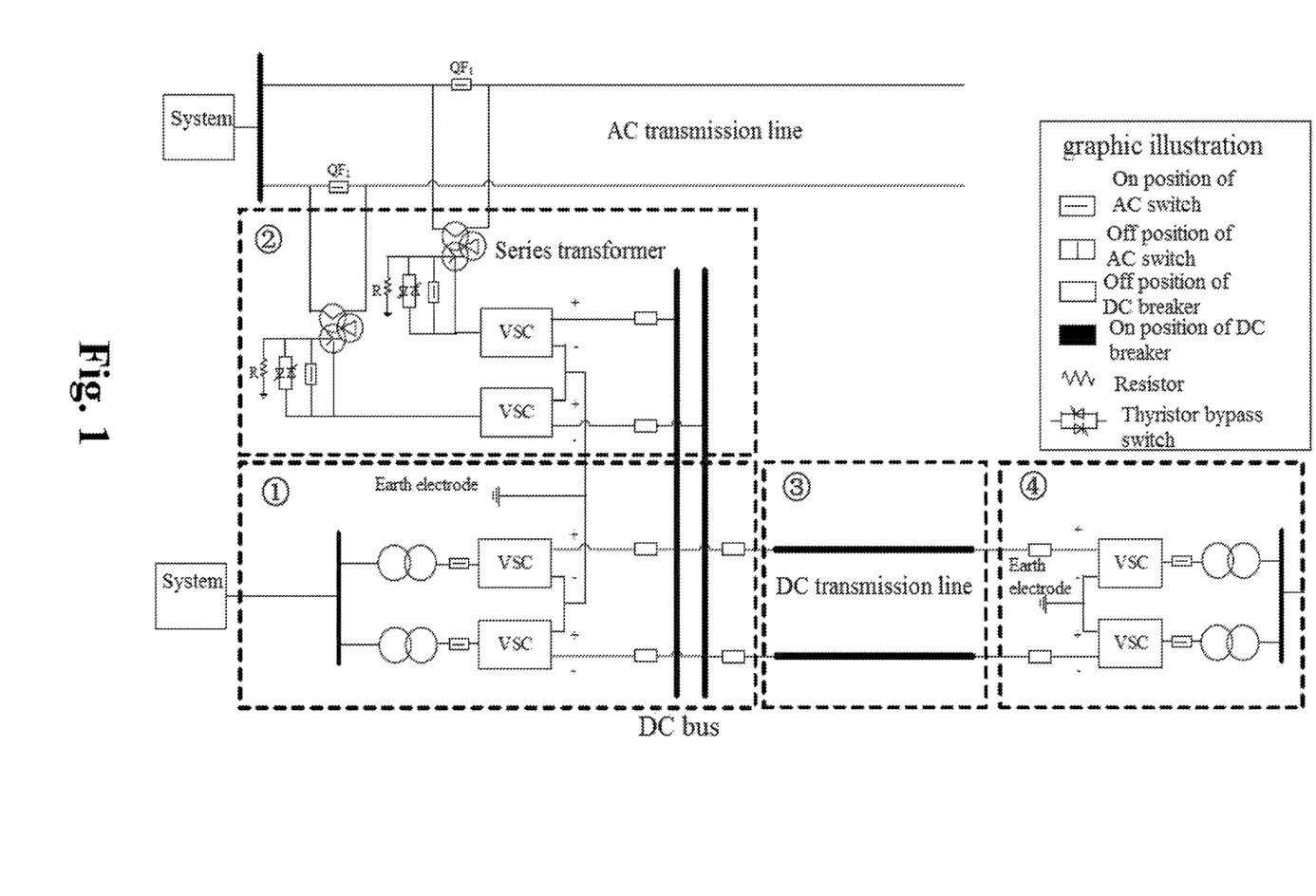
FIG. 1 is a structural diagram of a bipolar VSC-HVDC and UPFC hybrid topology.

As shown in FIG. 1, a Bipolar VSC-HVDC and UPFC Hybrid Topology includes a first control circuit, a second control circuit, a DC transmission line and a third control circuit.

The first control circuit with double circuit transmission lines can be used as a circuit at the series side of UPFC, including a positive circuit and a negative circuit, both of which contain a series VSC converter and a series transformer as well as a thyristor bypass switch, a fast mechanical bypass switch and a resistor installed between them, the VSC converter in the positive circuit and the negative circuit at the series side can operate in bipolar mode, and the positive and negative electrode of the first control circuit is connected to the DC bus via a DC breaker; the first control circuit can be used to control the power flow in double AC transmission lines. The series transformer in the positive and negative circuit at the series side is connected to the AC transmission line via a bypass switch.

The second control circuit includes a positive circuit and a negative circuit, both of which contain a serially connected shunt transformer and VSC converter. Among them, the VSC converters in the positive and negative circuit can operate in bipolar mode with an earth electrode (namely, the negative electrode of the VSC converter is connected to the ground), and the positive and negative electrode of the second control circuit are connected to the DC bus via a DC breaker; the second control circuit of the present invention can be used as not only the shunt side of the UPFC, but also one end of the bipolar VSC-HVDC system (HVDC flexible system) based on actual conditions.

The third control circuit is the same as the second control circuit in terms of structures; it can be used as not only the shunt side of the UPFC, but also the other end of the bipolar VSC-HVDC system (HVDC flexible system) based on actual conditions.

The third control circuit is the same as the second control circuit in terms of structures; one end of the DC transmission line is connected to the DC bus via a DC breaker; and the other end of the DC transmission line is connected to the positive and negative electrode of the third control circuit.

The VSC converters in the first control circuit and the second control circuit are connected to the same earth electrode.

The VSC converters in the first control circuit and the second control circuit are connected back to back to the same DC bus.

As shown in FIG. 1, the VSC converters in the series circuit of the UPFC are connected to the same earth electrode with those in the second control circuit (a parallel circuit of the first UPFC) in the preferred embodiment of the present invention. The first and second control circuit can operate in the double circuit UPFC mode; the second control circuit, DC transmission line and the third control circuit formulate a two-end bipolar flexible DC transmission system which can be directly expanded to multi-end bipolar flexible DC transmission system. Therefore, the first, second and third control circuit and the DC transmission line can formulate a bipolar VSC-HVDC and UPFC hybrid transmission system.

The operation method of a Bipolar VSC-HVDC and UPFC Hybrid Topology includes the following steps:

Step 1: Control the operation status of the first, second and third control circuit in the Bipolar VSC-HVDC and UPFC Hybrid Topology to formulate a designed electrical system;

Step 2: Control the first, second and third control circuit in the designed electrical system respectively based on the designed control method.

The designed electrical system in Step 1 can be specifically divided into the following four kinds:

1.1 Enable the first, second and third control circuit and the DC transmission line to formulate a bipolar VSC-HVDC and UPFC hybrid system;

1.2 Enable the first and second control circuit; and disable the DC transmission line and the third control circuit to formulate a UPFC system;

1.3 Disable the first control circuit; and enable the second control circuit, DC transmission line and the third control circuit to formulate a bipolar VSC-HVDC system;

1.4 Enable the first control circuit, DC transmission line and the third control circuit; and disable the second control circuit to formulate a generalized UPFC system.

Figure 2:
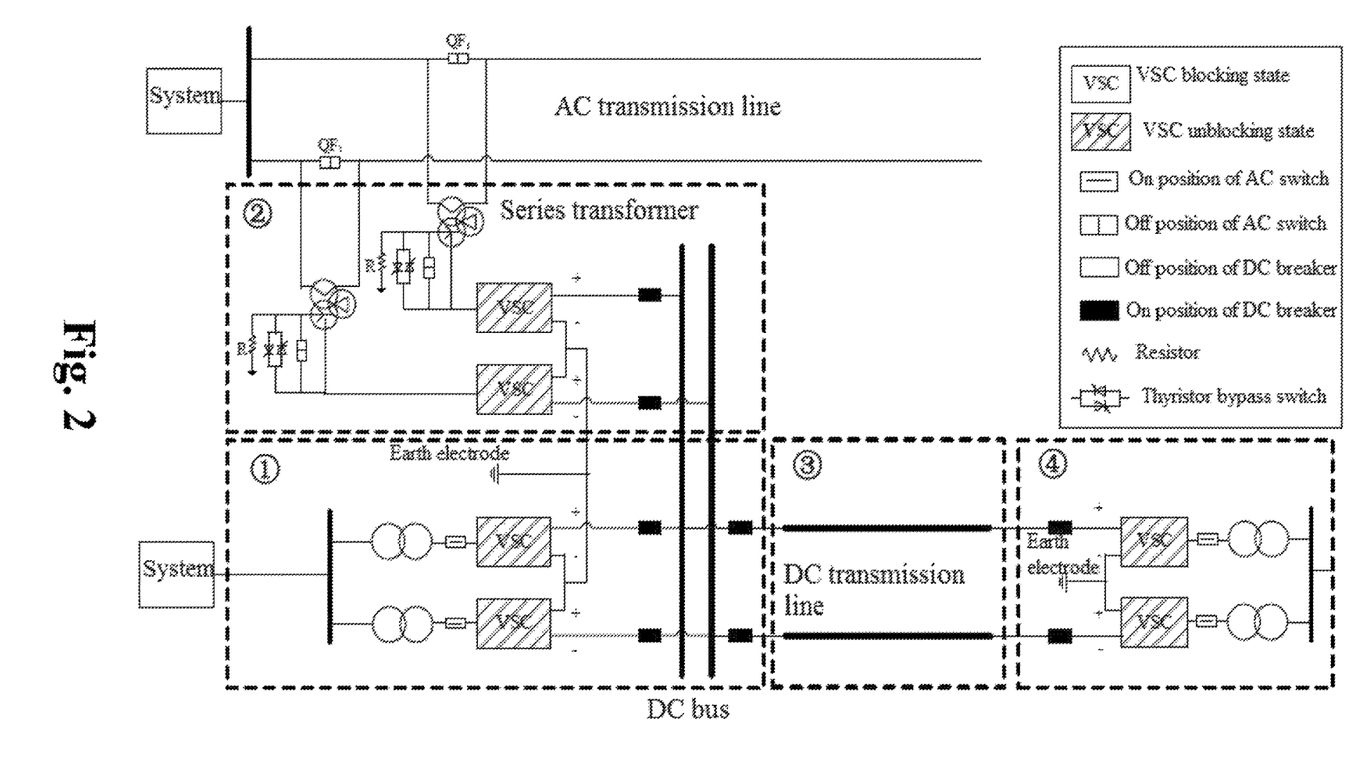
FIG. 2 is an operation diagram of a bipolar VSC-HVDC and UPFC hybrid system.

Step 2 can be divided into the following procedures:

2.1 When a bipolar VSC-HVDC and UPFC hybrid system is adopted for the electrical system, the constant DC voltage control method can be used to control the second control circuit and regulate the reactive voltage of AC system; the line power control method can be used to control the first control circuit and the active or reactive power of the transmission line; the constant active power control method can be used to control the third control circuit and regulate the reactive voltage of AC system; see FIG. 2 for more information.

When a bipolar VSC-HVDC and UPFC hybrid system is adopted for the electrical system, the following methods can be adopted in case of any failures;

(1) In case of any failures occurred in the transmission line, enable the DC breaker at both sides of the faulted transmission line through the protection action, and block the VSC converter connected to the faulted transmission line in the third control circuit; the VSC converter in the second control circuit can operate continuously to control DC voltage and unipolar transmission power of the VSC-HVDC system; and the VSC converter in the first control circuit can operate continuously to control the power of cobble circuit lines;

(2) In case of any failures occurred in the third control circuit, block the faulted VSC converter in the third control circuit through the protection action and enable the DC breaker connected to the faulted VSC converter; the VSC converter in the second control circuit can operate continuously to control DC voltage and unipolar transmission power of the VSC-HVDC system; and the VSC converter in the first control circuit can operate continuously to control the power of double circuit lines;

(3) In case of any failures occurred in the second control circuit, block the faulted VSC converter in the second control circuit through the protection action and enable the DC breaker connected to the faulted VSC converter; the VSC converter in the third control circuit can operate continuously and the control method of the faulted VSC converter is changed into constant DC voltage control with unipolar transmission power of the VSC-HVDC system and the VSC converter in the first control circuit can operate continuously to control the power of double circuit lines;

(4) in case of any failures occurred in the first control circuit, block the faulted VSC converter in the first control circuit through the protection action and enable the DC breaker connected to the faulted VSC converter. At the meantime, switch on the corresponding bypass switch at the series side and enable the second control circuit, DC transmission line and the third control circuit.

Take the positive electrode fault in FIG. 1 as an example, the fault isolation can be elaborated in accordance with the aforesaid methods, $\hat{1}$, $\hat{2}$, $\hat{3}$ and $\hat{4}$ in FIG. 1 represent the second control circuit, the first control circuit, the DC transmission line and the third control circuit respectively.

Figure 3:
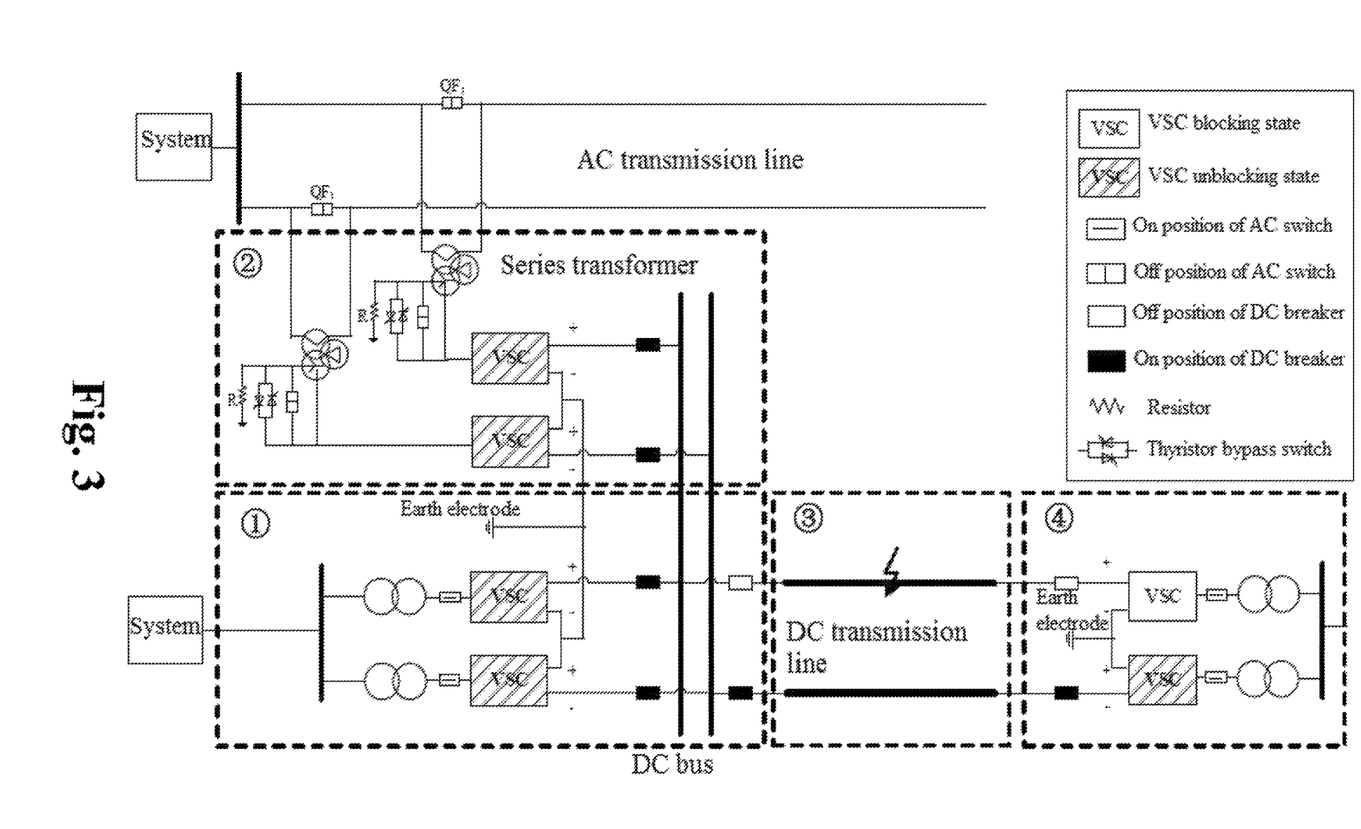
FIG. 3 is a schematic diagram of system operation after fault tripping of the positive electrode in Region $\hat{3}$ of the bipolar VSC-HVDC and UPFC hybrid system.

In case of any failures occurred in $\hat{3}$, enable the DC breakers at both sides of the faulted DC transmission line and block the faulted electrode VSC in $\hat{4}$; the two faulted VSC in $\hat{1}$ can operate continuously to control DC voltage and unipolar transmission power of the VSC-HVDC system; and the VSC in $\hat{2}$ can operate continuously to control the power of double circuit lines. The operation diagram is shown in FIG. 3.

Figure 4:
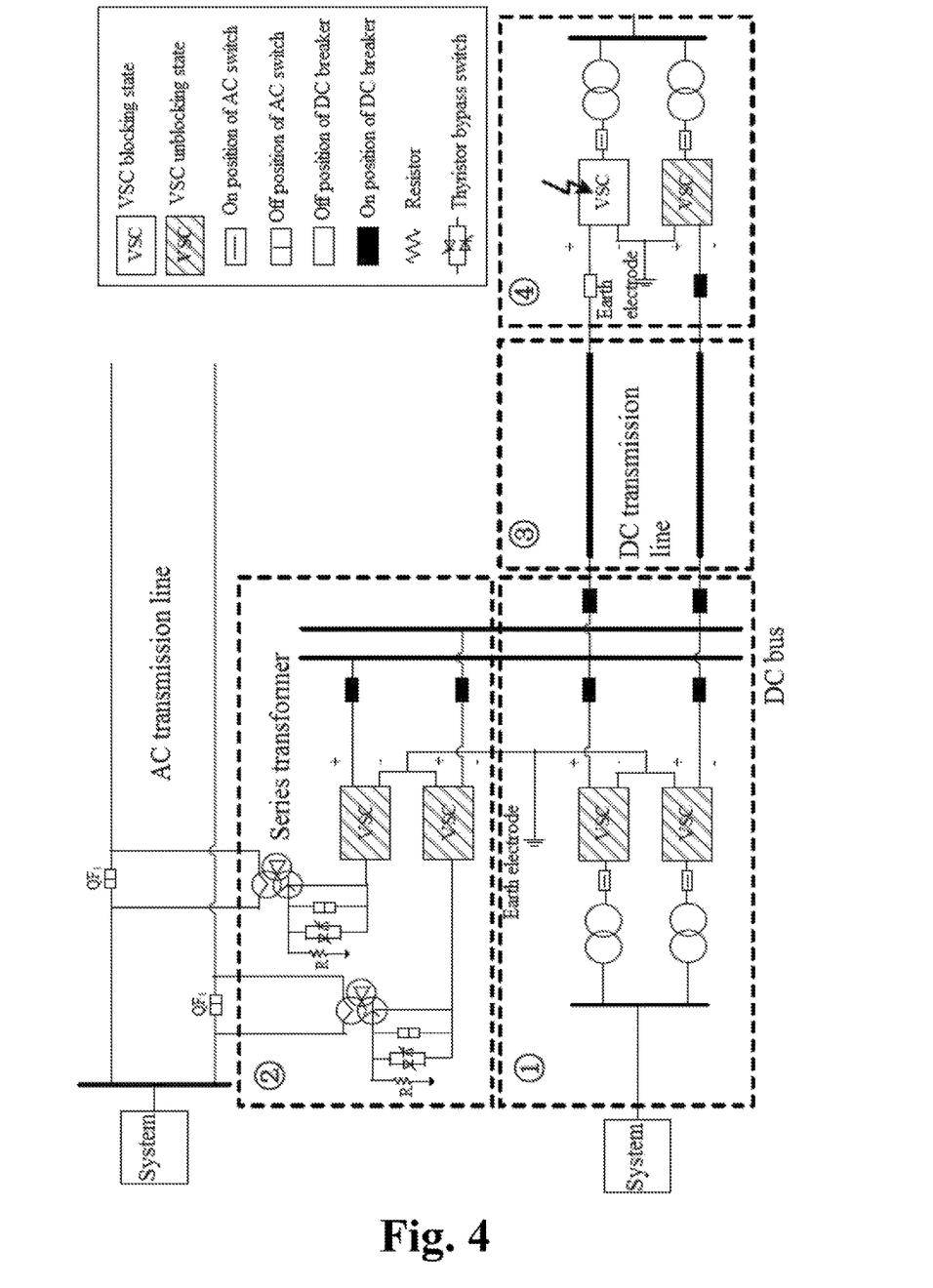
FIG. 4 is a schematic diagram of system operation after fault tripping of the positive electrode in Region $\hat{4}$ of the bipolar VSC-HVDC and UPFC hybrid system.

In case of any failures occurred in $\hat{4}$, block the faulted electrode VSC in $\hat{4}$ through the protection action and enable the DC breaker connected to the faulted electrode; the two faulted VSC in $\hat{1}$ can operate continuously to control DC voltage and unipolar transmission power of the VSC-HVDC system; and the VSC in 2̂ can operate continuously to control the power of double circuit lines. The operation diagram is shown in FIG. 4.

Figure 5:
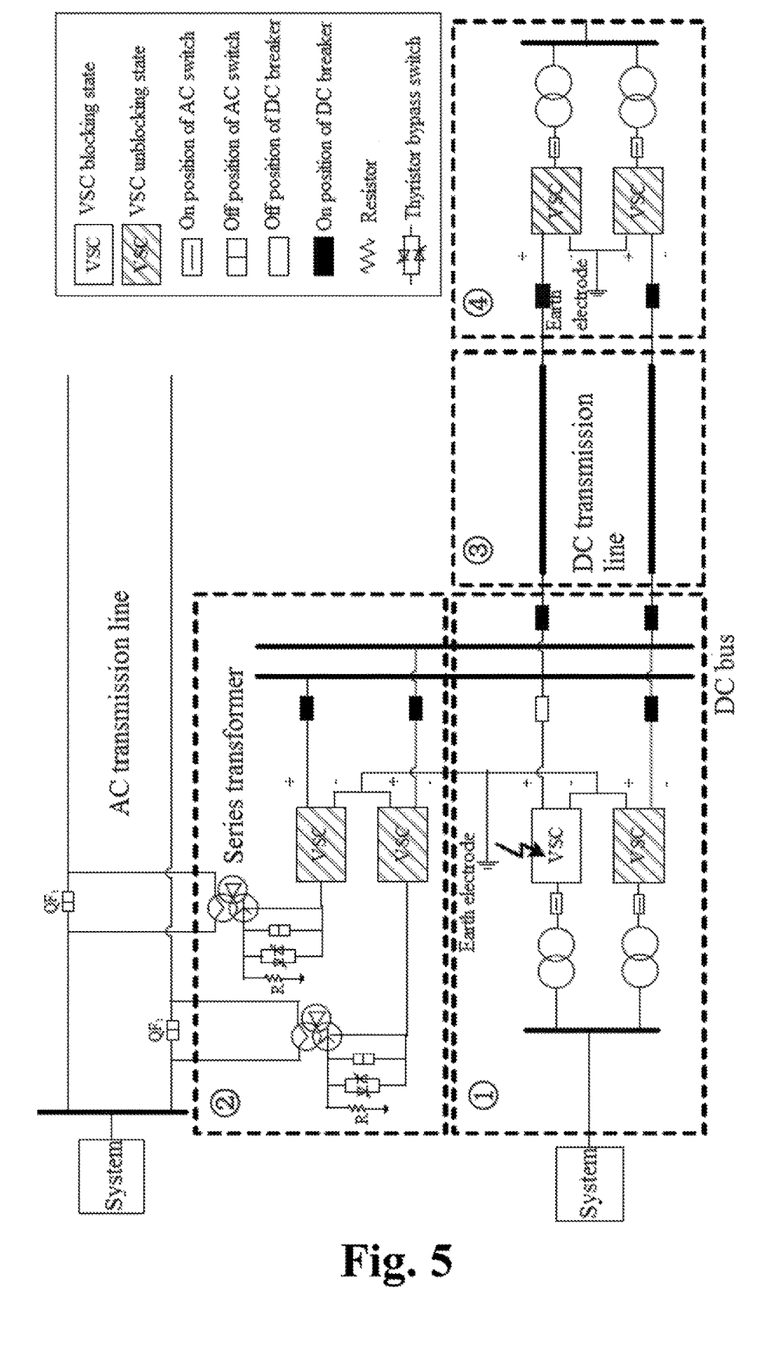
FIG. 5 is a schematic diagram of system operation after fault tripping of the positive electrode in Region $\hat{1}$ of the bipolar VSC-HVDC and UPFC hybrid system.

In case of any failures occurred in 1̂, block the faulted electrode VSC in 4̂ through the protection action and enable the DC breaker connected to the faulted electrode; the two faulted VSC in 4̂ can operate continuously and the control method of the faulted electrode is changed into constant DC voltage control with unipolar transmission power of the VSC-HVDC system; and the VSC in 2̂ can operate continuously to control the power of double circuit lines. The operation diagram is shown in FIG. 5.

Figure 6:
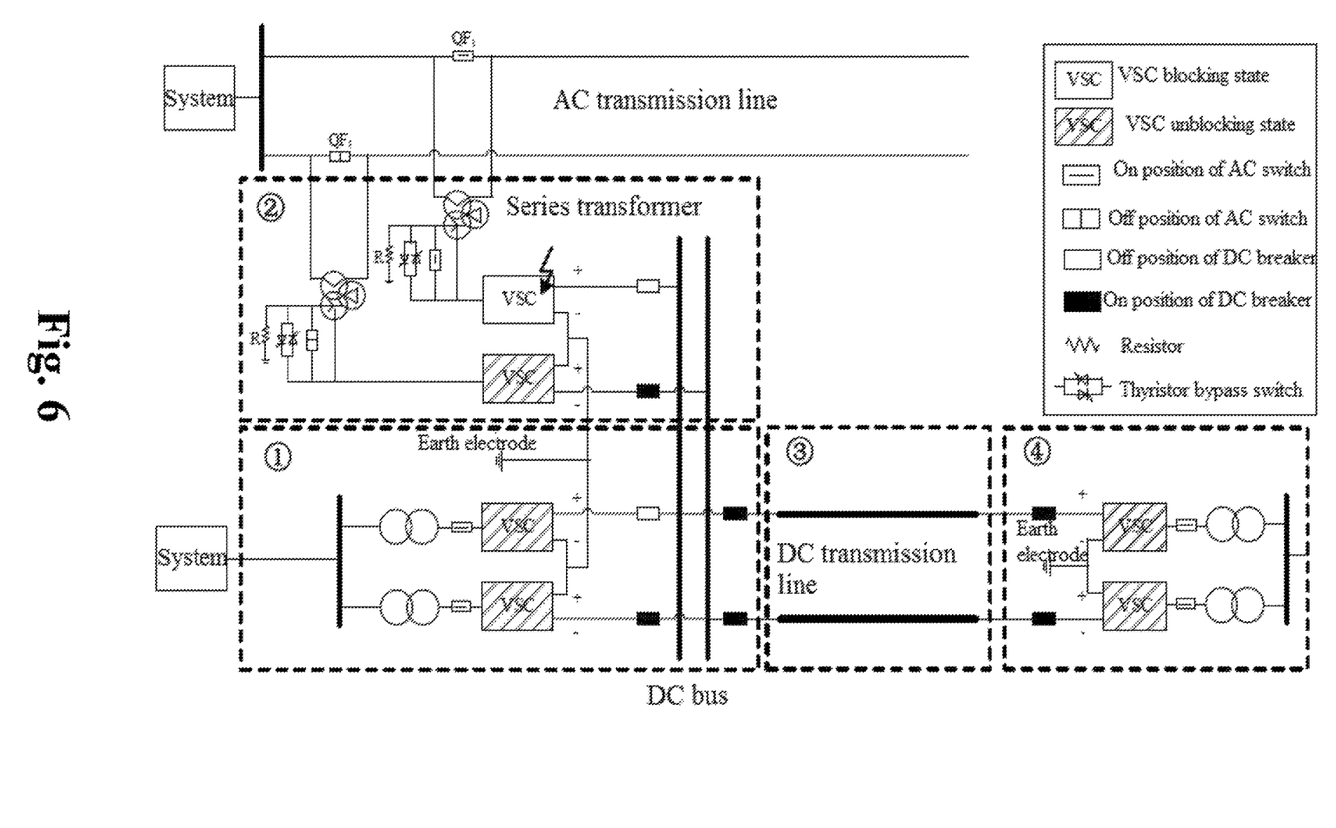
FIG. 6 is a schematic diagram of system operation after fault tripping of the positive electrode in Region $\hat{2}$ of the bipolar VSC-HVDC and UPFC hybrid system.
Figure 7:
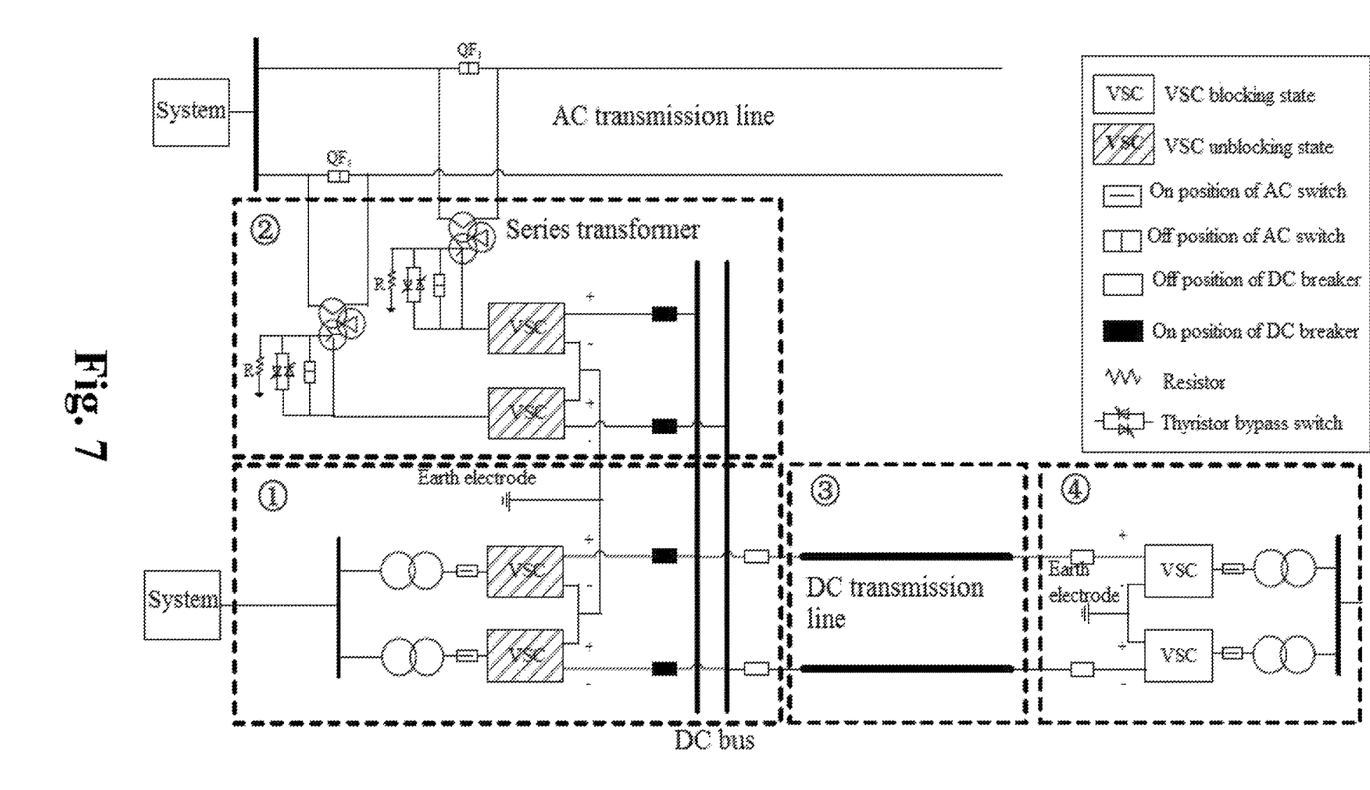
FIG. 7 is an operation diagram of the UPFC system.

In case of any failures occurred in 2̂, block the faulted electrode VSC in 2̂ through the protection action and enable the DC breaker connected to the faulted electrode; at the meantime, switch on the corresponding bypass switch at the series side and enable 1̂, 3̂ and 4̂. The operation diagram is shown in FIG. 6.

2.2 When a UPFC system is adopted for the electrical system, the constant DC voltage control method can be used to control the second control circuit and regulate the reactive voltage of AC system; the line power control method can be used to control the first control circuit and the active or reactive power of the transmission line; block or disable the VSC converter in the third control circuit.

When a UPFC system is adopted for the electrical system, in case of any failures occurred to the UPFC system, the same method for the bipolar VSC-HVDC and UPFC hybrid system can be adopted to isolate the failures.

Figure 8:
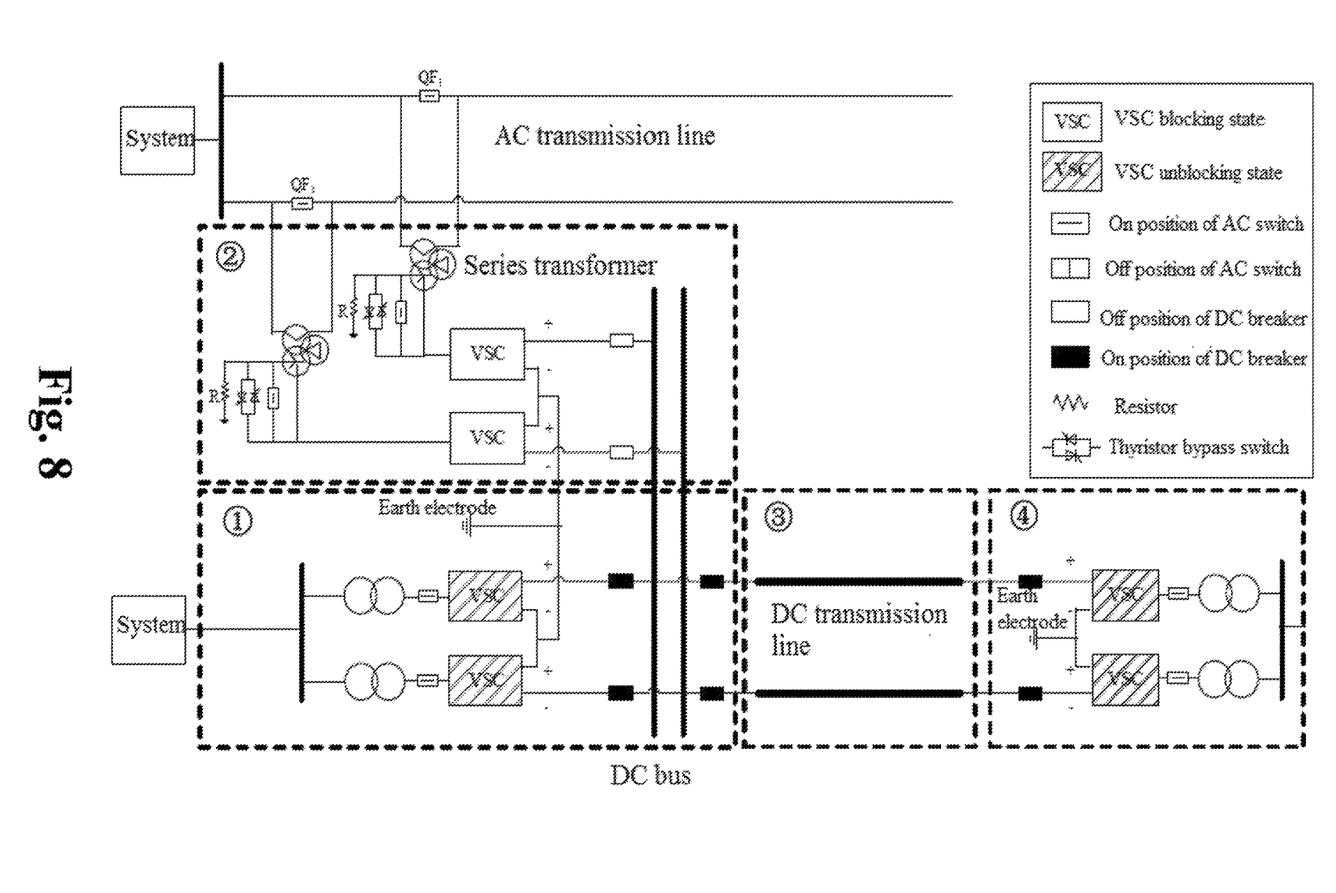
FIG. 8 is an operation diagram of the VSC-HVDC system.

2.3 When a bipolar VSC-HVDC system is adopted for the electrical system, the constant DC voltage control method can be used to control the second control circuit and regulate the reactive voltage of AC system, the constant active power control method can be used to control the third control circuit and regulate the reactive voltage of AC system; block or disable the VSC converter in the first control circuit and turn on the corresponding bypass switch; the operation diagram is shown in FIG. 8.

When a bipolar VSC-HVDC system is adopted for the electrical system, in case of any failures occurred to the bipolar VSC-HVDC system, the same method for the bipolar VSC-HVDC and UPFC hybrid system can be adopted to isolate the failures.

Figure 9:
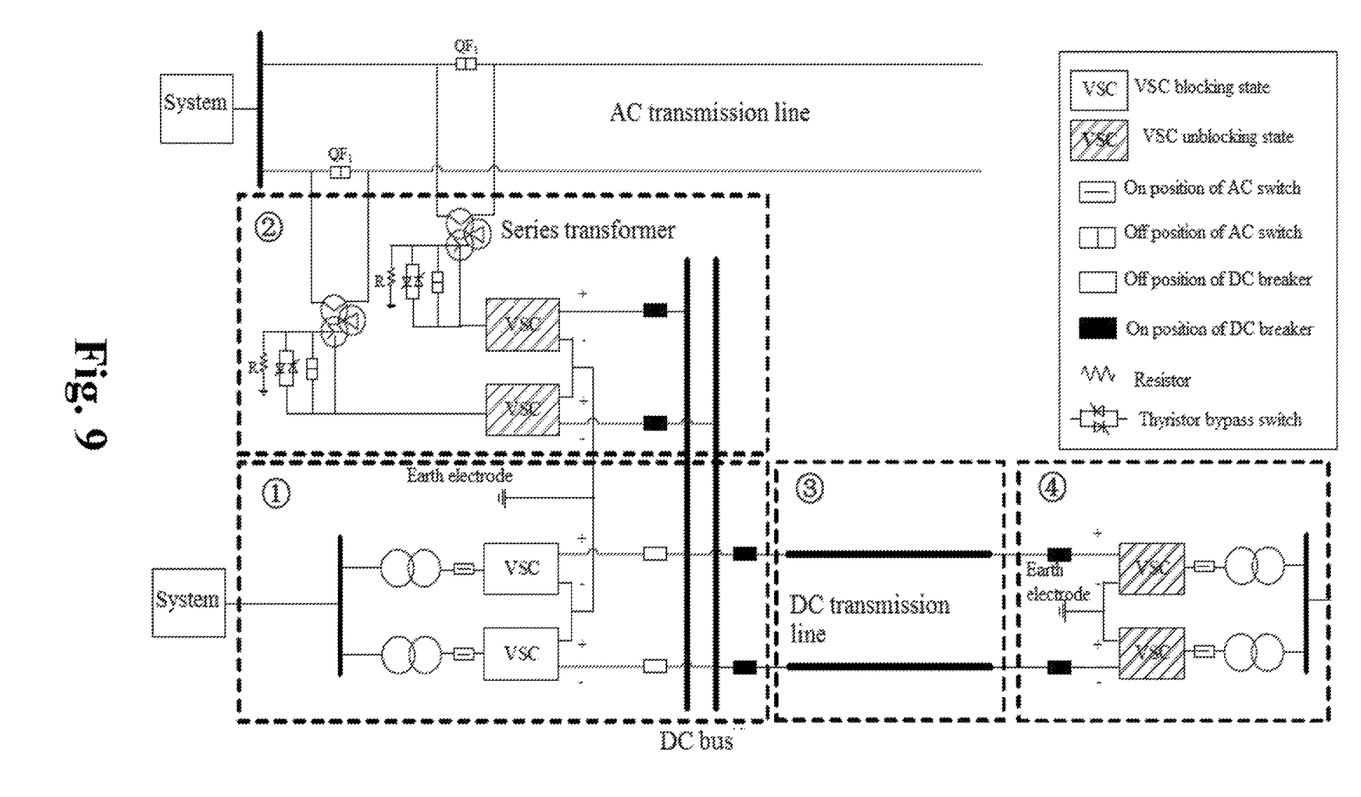
FIG. 9 is an operation diagram of the generalized UPFC system.

2.4 When a generalized UPFC system is adopted for the electrical system, the constant DC voltage control method can be used to control the third control circuit and regulate the reactive voltage of AC system; the line power control method can be used to control the first control circuit and the active or reactive power of the transmission line; block or disable the VSC converter in the second control circuit. The operation diagram is shown in FIG. 9.

When a generalized UPFC system is adopted for the electrical system, in case of any failures occurred to the generalized UPFC system, the same method for the bipolar VSC-HVDC and UPFC hybrid system can be adopted to isolate the failures.

In conclusion, the present invention not only integrates the functions and advantages of VSC-HVDC and UPFC, but also features long distance power transmission for flexible DC projects and distribution control of AC power flow in UPFC mode. In addition, the bipolar structure can be combined with the operation method to improve the flexibility and availability of system operation, switching between the fault operation modes of equipment and making full use of equipment capacity.

The above contents have described the basic principles, main features and advantages of the present invention. The technical personnel in this industry must be informed that the present invention shall not be subject to the above embodiments. What is described in the above embodiments and instruction is only to illustrate the principle of the present invention. Without departing from the spirit and scope of the present invention, various modifications and alterations of the present invention will be included in the scope of protection required by the present invention, which shall be subject to the attached claims and its equivalents.

What is claimed is:

1. A bipolar VSC-HVDC and UPFC hybrid topology, comprising
   a first control circuit, a second control circuit, a DC transmission line and a third control circuit, wherein,
   the first control circuit is a double circuit lines structure used as a circuit at series side of UPFC, and comprises a series side positive circuit and a series side negative circuit, both of which include a series VSC converter and a series transformer,
   the first control circuit further comprises a thyristor bypass switch, a mechanical bypass switch and a resistor connected between the VSC converter and the series transformer, the VSC converters in the series side positive circuit and the series side negative circuit operate in bipolar mode, and positive and negative electrodes of the first control circuit is connected to a DC bus via a DC breaker;
   the second control circuit comprises a positive circuit and a negative circuit, both of which include a shunt transformer and a VSC converter,
   the VSC converters in the positive and negative circuit operate in bipolar mode and are configured with an earth electrode, and positive and negative electrodes of the second control circuit are connected to the DC bus via a DC breaker;
   the third control circuit is the same as the second control circuit in terms of structures;
   one end of the DC transmission line is connected to the DC bus via a DC breaker and the other end of the DC transmission line is connected to positive and negative electrodes of the third control circuit via a DC breaker respectively.

2. The bipolar VSC-HVDC and UPFC hybrid topology according to claim 1, wherein,
   the VSC converters in the first control circuit and the second control circuit are connected to the same earth electrode.

3. The bipolar VSC-HVDC and UPFC hybrid topology according to claim 1, wherein,
   the VSC converters in the first control circuit and the second control circuit are connected back to back and connected to the same DC bus.

4. An operation method of a bipolar VSC-HVDC and UPFC hybrid topology, comprising the following steps:
   Step 1: controlling operation status of a first control circuit, second control circuit and third control circuit in a bipolar VSC-HVDC and UPFC hybrid topology to formulate a designed electrical system;
   Step 2: controlling the first control circuit, second control circuit and third control circuit in the designed electrical system respectively based on a predetermined control method,
   wherein,
   the designed electrical system in Step 1 has following four kinds:

1.1 enabling the first control circuit, second control circuit and third control circuit and a DC transmission line to formulate a bipolar VSC-HVDC and UPFC hybrid system;

1.2 enabling the first control circuit and second control circuit and disabling a DC transmission line and the third control circuit to formulate a UPFC system;

1.3 disabling the first control circuit and enabling the second control circuit, a DC transmission line and the third control circuit to formulate a bipolar VSC-HVDC system;

1.4 enabling the first control circuit, a DC transmission line and the third control circuit and disabling the second control circuit to formulate a generalized UPFC system.

5. The operation method according to claim 4, wherein, Step 2 comprises following procedures:

2.1 when a bipolar VSC-HVDC and UPFC hybrid system is adopted for the electrical system, a constant DC voltage control method is used to control the second control circuit and regulate a reactive voltage of AC system; a line power control method is used to control the first control circuit and active or reactive power of a transmission line; a constant active power control method is used to control the third control circuit and regulate the reactive voltage of AC system;

2.2 when a UPFC system is adopted for the electrical system, a constant DC voltage control method is used to control the second control circuit and regulate a reactive voltage of AC system; a line power control method is used to control the first control circuit and active or reactive power of a transmission line; a VSC converter in the third control circuit is blocked or disabled;

2.3 when a bipolar VSC-HVDC system is adopted for the electrical system, a constant DC voltage control method is used to control the second control circuit and regulate a reactive voltage of AC system; a constant active power control method is used to control the third control circuit and regulate a reactive voltage of AC system; a VSC converter in the first control circuit is blocked or disabled and a corresponding bypass switch is switched on;

2.4 when a generalized UPFC system is adopted for the electrical system, a constant DC voltage control method is used to control the third control circuit and regulate a reactive voltage of AC system; a line power control method is used to control the first control circuit and active or reactive power of a transmission line; a VSC converter in the second control circuit is blocked or disabled.

6. The operation method according to claim 4, wherein, when a bipolar VSC-HVDC and UPFC hybrid system is adopted for the electrical system, the following methods are adopted in case of any failures:

(1) in case of any failures occurred in a transmission line, DC breakers at both sides of a faulted transmission line are enabled by a protection action, a VSC converter connected to the faulted transmission line in the third control circuit is blocked, a VSC converter in the second control circuit operates continuously to control DC voltage, the VSC-HVDC system transmits power in unipolar, and a VSC converter in the first control circuit operates continuously to control a power of double circuit lines;

(2) in case of any failures occurred in the third control circuit, a faulted VSC converter in the third control circuit is blocked by a protection action, a DC breaker connected to the faulted VSC converter is enabled, two VSC converters in the second control circuit operate continuously to control DC voltage, the VSC-HVDC system transmits power in unipolar, and a VSC converter in the first control circuit operates continuously to control a power of double circuit lines;

(3) in case of any failures occurred in the second control circuit, a faulted VSC converter in the second control circuit is blocked by a protection action, a DC breaker connected to the faulted VSC converter is enabled, a VSC converter in the third control circuit operates continuously, and a control mode of the faulted VSC converter is changed to constant DC voltage control, the VSC-HVDC system transmits power in unipolar, and a VSC converter in the first control circuit operates continuously to control a power of double circuit lines;

(4) in case of any failures occurred in the first control circuit, a faulted VSC converter in the first control circuit is blocked by a protection action, a DC breaker connected to the faulted VSC converter is enabled, a corresponding bypass switch at series side is switched on, and the second control circuit, DC transmission line and the third control circuit operate continuously.

* * * * *